(12) United States Patent
Zhou

(10) Patent No.: US 11,620,165 B2
(45) Date of Patent: Apr. 4, 2023

(54) SYSTEM FOR AUTOMATED RESOURCE TRANSFER PROCESSING USING A DISTRIBUTED SERVER NETWORK

(71) Applicant: Bank of America Corporation, Charlotte, NC (US)

(72) Inventor: Enming Zhou, Thousand Oaks, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 232 days.

(21) Appl. No.: 16/597,439

(22) Filed: Oct. 9, 2019

(65) Prior Publication Data
US 2021/0109797 A1 Apr. 15, 2021

(51) Int. Cl.
G06F 9/50 (2006.01)
H04L 67/10 (2022.01)
H04L 67/104 (2022.01)

(52) U.S. Cl.
CPC .......... G06F 9/5083 (2013.01); H04L 67/10 (2013.01); H04L 67/104 (2013.01)

(58) Field of Classification Search
CPC . G06F 9/5083; H04L 67/10; H04L 2463/102; H04L 67/104; G06Q 20/00
USPC .......................................... 718/104; 709/225
See application file for complete search history.

(56) References Cited

U.S. PATENT DOCUMENTS

| | | |
|---|---|---|
| 6,993,763 B2 | 1/2006 | Hayes, Jr. |
| 7,668,939 B2 | 2/2010 | Encarnacion et al. |
| 7,934,035 B2 | 4/2011 | Miloushev et al. |
| 8,095,662 B1 | 1/2012 | Lappas et al. |
| 8,316,237 B1 | 11/2012 | Felsher et al. |
| 8,364,638 B2 | 1/2013 | Nickolov et al. |
| 8,543,665 B2 | 9/2013 | Ansari et al. |
| 8,589,288 B1 * | 11/2013 | Meyer .................... G06Q 40/00 705/39 |
| 8,589,372 B2 | 11/2013 | Krislov |
| 8,768,934 B2 | 7/2014 | Jones et al. |
| 9,143,392 B2 | 9/2015 | Duchesneau |
| 9,152,642 B2 | 10/2015 | Harrison et al. |
| 9,152,643 B2 | 10/2015 | Whitehead et al. |
| 9,317,223 B2 | 4/2016 | Reohr et al. |

(Continued)

OTHER PUBLICATIONS

Docs, Key Concepts, Hyperledger Fabric Functionalities; retrieved from the internet at https://hyperledger-fabric.readthedocs.io/en/release-1.4/functionalities.html on Aug. 27, 2020; © Copyright Hyperledger 2019; 16 pages.

Primary Examiner — David R Lazaro
Assistant Examiner — Mariegeorges A Henry
(74) Attorney, Agent, or Firm — Moore & Van Allen PLLC; Seongun M. Hong

(57) ABSTRACT

A system provides automated resource transfer processing using a distributed server network. In particular, the system may comprise a distributed database of data records relating to resource transfers which may be accessible by authorized users and/or entities. The distributed database may further comprise executable code which may be submitted and/or approved by the authorized users and/or entities before being deployed to the distributed database. Once deployed, the system may automatically execute the executable code upon detecting the existence of certain triggers, thereby enabling the system to efficiently resolve the steps in the resource transfer process on behalf of multiple disparate entities.

15 Claims, 5 Drawing Sheets

(56) References Cited

U.S. PATENT DOCUMENTS

| | | |
|---|---|---|
| 9,407,516 B2 | 8/2016 | Gordon |
| 9,594,597 B2 | 3/2017 | Werth et al. |
| 9,686,121 B2 | 6/2017 | Stickle et al. |
| 10,440,101 B2 * | 10/2019 | Kurian .................... G06F 21/64 |
| 2014/0250145 A1 | 9/2014 | Jones et al. |
| 2015/0058467 A1 | 2/2015 | Douglas et al. |
| 2016/0048408 A1 | 2/2016 | Madhu et al. |
| 2016/0134754 A1 | 5/2016 | Petrovykh |
| 2016/0357550 A1 * | 12/2016 | Thomas .................... G06F 8/77 |
| 2016/0380842 A1 | 12/2016 | Cordray et al. |
| 2017/0206603 A1 * | 7/2017 | Al-Masoud ............ G06Q 40/06 |
| 2017/0286516 A1 | 10/2017 | Horowitz et al. |
| 2020/0250663 A1 * | 8/2020 | Abad .................... H04L 9/0637 |

\* cited by examiner

SYSTEM FOR AUTOMATED RESOURCE TRANSFER PROCESSING USING A DISTRIBUTED SERVER NETWORK

FIELD OF THE INVENTION

The present disclosure embraces a system for automated resource transfer processing using a distributed server network.

BACKGROUND

There is a need for an efficient and accurate way to automate resource transfer processes.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for automated resource transfer processing using a distributed server network. In particular, the system may comprise a distributed database of data records relating to resource transfers which may be accessible by authorized users and/or entities. The distributed database may further comprise executable code which may be submitted and/or approved by the authorized users and/or entities before being deployed to the distributed database. Once deployed, the system may automatically execute the executable code upon detecting the existence of certain triggers, thereby enabling the system to efficiently resolve the steps in the resource transfer process on behalf of multiple disparate entities.

Accordingly, embodiments of the present disclosure provide a system for performing resource transfers using a distributed server. The system may comprise a memory device with computer-readable program code stored thereon; a communication device; and a processing device operatively coupled to the memory device and the communication device. The processing device may be configured to execute the computer-readable program code to detect that a first set of conditions has triggered a first set of executable code; automatically execute the first set of executable code to transmit a resource transfer request to a second entity; detect a transfer of an amount of resources from the second entity to a first entity; detect that a second set of conditions has triggered a second set of executable code; and automatically execute the second set of executable code to transfer a first allocation of the amount of resources from the first entity to a third entity.

In some embodiments, the distributed server hosts a distributed ledger. In such embodiments, the computer-readable program code may further cause the processing device to submit a request to add a third set of executable code to the distributed ledger; validate the third set of executable code; receive validation of the third set of executable code from a second entity node; receive validation of the third set of executable code from a third entity node; and deploy the third set of executable code to the distributed ledger.

In some embodiments, the distributed ledger is a channel-dependent chained repository, wherein data records of the distributed ledger are assigned to a first private channel.

In some embodiments, automatically executing the second set of executable code further comprises transferring a second allocation of the amount of resources from the first entity to a fourth entity.

In some embodiments, the computer-readable program code further causes the processing device to provide authorized access of the distributed server to a non-related third-party entity.

In some embodiments, the distributed server hosts a distributed ledger, wherein the first set of executable code and the second set of executable code are deployed to the distributed ledger as smart contracts.

In some embodiments, the first set of conditions comprises a security term.

In some embodiments, the second set of conditions comprises receipt of the amount of resources by the first entity.

Embodiments of the present disclosure also provide a computer program product for performing resource transfers using a distributed server. The computer program product may comprise at least one non-transitory computer readable medium having computer-readable program code portions embodied therein, the computer-readable program code portions comprising executable code portions for detecting that a first set of conditions has triggered a first set of executable code; automatically executing the first set of executable code to transmit a resource transfer request to a second entity; detecting a transfer of an amount of resources from the second entity to a first entity; detecting that a second set of conditions has triggered a second set of executable code; and automatically executing the second set of executable code to transfer a first allocation of the amount of resources from the first entity to a third entity.

In some embodiments, the distributed server hosts a distributed ledger. In such embodiments, the computer-readable program code portions may further comprise executable code portions for submitting a request to add a third set of executable code to the distributed ledger; validating the third set of executable code; receiving validation of the third set of executable code from a second entity node; receiving validation of the third set of executable code from a third entity node; and deploying the third set of executable code to the distributed ledger.

In some embodiments, the distributed ledger is a channel-dependent chained repository, wherein data records of the distributed ledger are assigned to a first private channel.

In some embodiments, automatically executing the second set of executable code further comprises transferring a second allocation of the amount of resources from the first entity to a fourth entity.

In some embodiments, the computer-readable program code portions further comprise executable code portions for providing authorized access of the distributed server to a non-related third-party entity.

In some embodiments, the distributed server hosts a distributed ledger, wherein the first set of executable code and the second set of executable code are deployed to the distributed ledger as smart contracts.

In some embodiments, the first set of conditions comprises a security term.

Embodiments of the present disclosure also provide a computer-implemented method for performing resource transfers using a distributed server. The method may comprise detecting that a first set of conditions has triggered a first set of executable code; automatically executing the first set of executable code to transmit a resource transfer request to a second entity; detecting a transfer of an amount of resources from the second entity to a first entity; detecting that a second set of conditions has triggered a second set of executable code; and automatically executing the second set of executable code to transfer a first allocation of the amount of resources from the first entity to a third entity.

In some embodiments, the distributed server hosts a distributed ledger. In such embodiments, the method further comprises submitting a request to add a third set of executable code to the distributed ledger; validating the third set of executable code; receiving validation of the third set of executable code from a second entity node; receiving validation of the third set of executable code from a third entity node; and deploying the third set of executable code to the distributed ledger.

In some embodiments, the distributed ledger is a channel-dependent chained repository, wherein data records of the distributed ledger are assigned to a first private channel.

In some embodiments, automatically executing the second set of executable code further comprises transferring a second allocation of the amount of resources from the first entity to a fourth entity.

In some embodiments, the method further comprises providing authorized access of the distributed server to a non-related third-party entity.

In some embodiments, the distributed server hosts a distributed ledger, wherein the first set of executable code and the second set of executable code are deployed to the distributed ledger as smart contracts.

In some embodiments, the first set of conditions comprises a security term.

In some embodiments, the second set of conditions comprises receipt of the amount of resources by the first entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
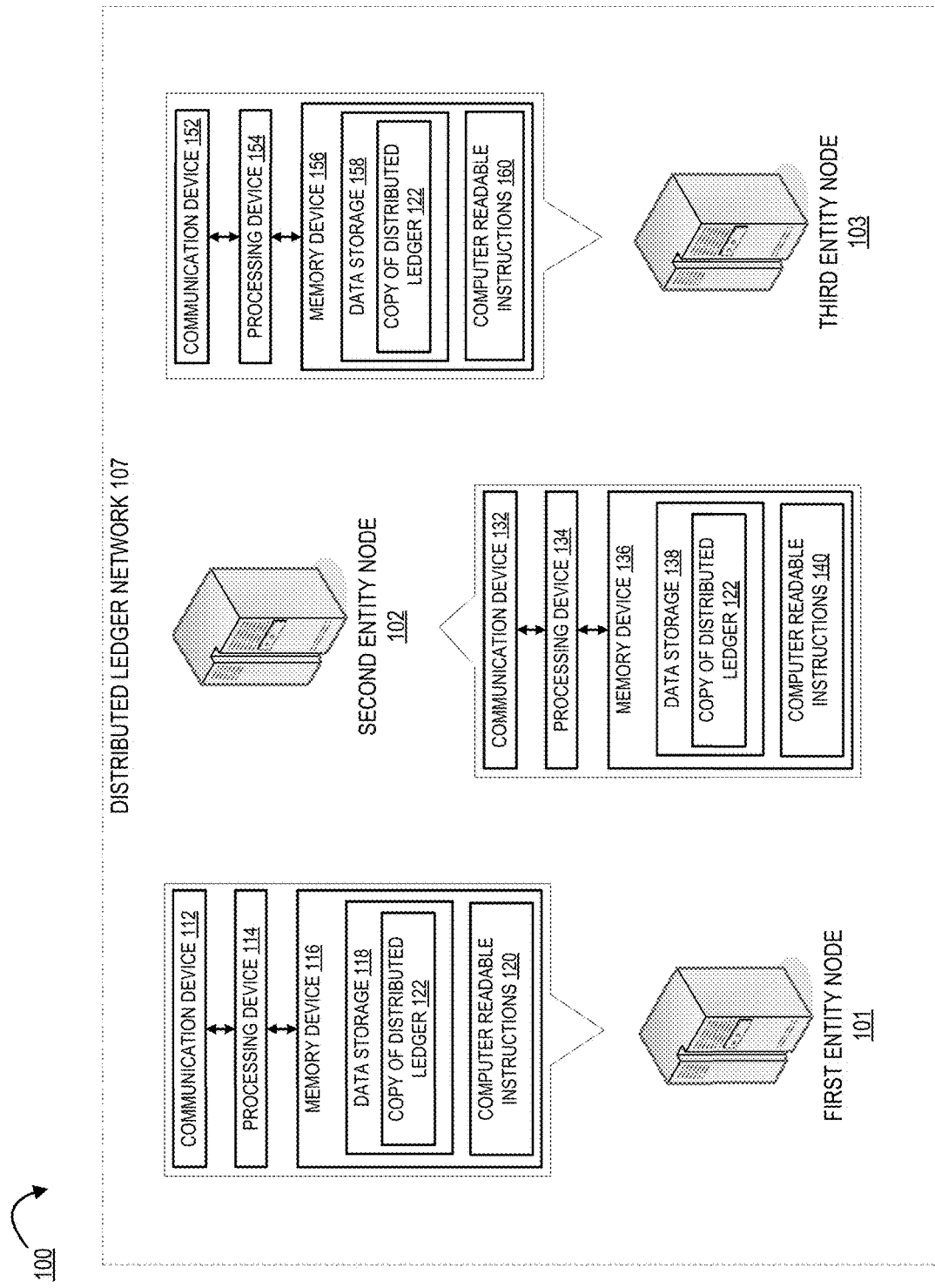
Figure 2:
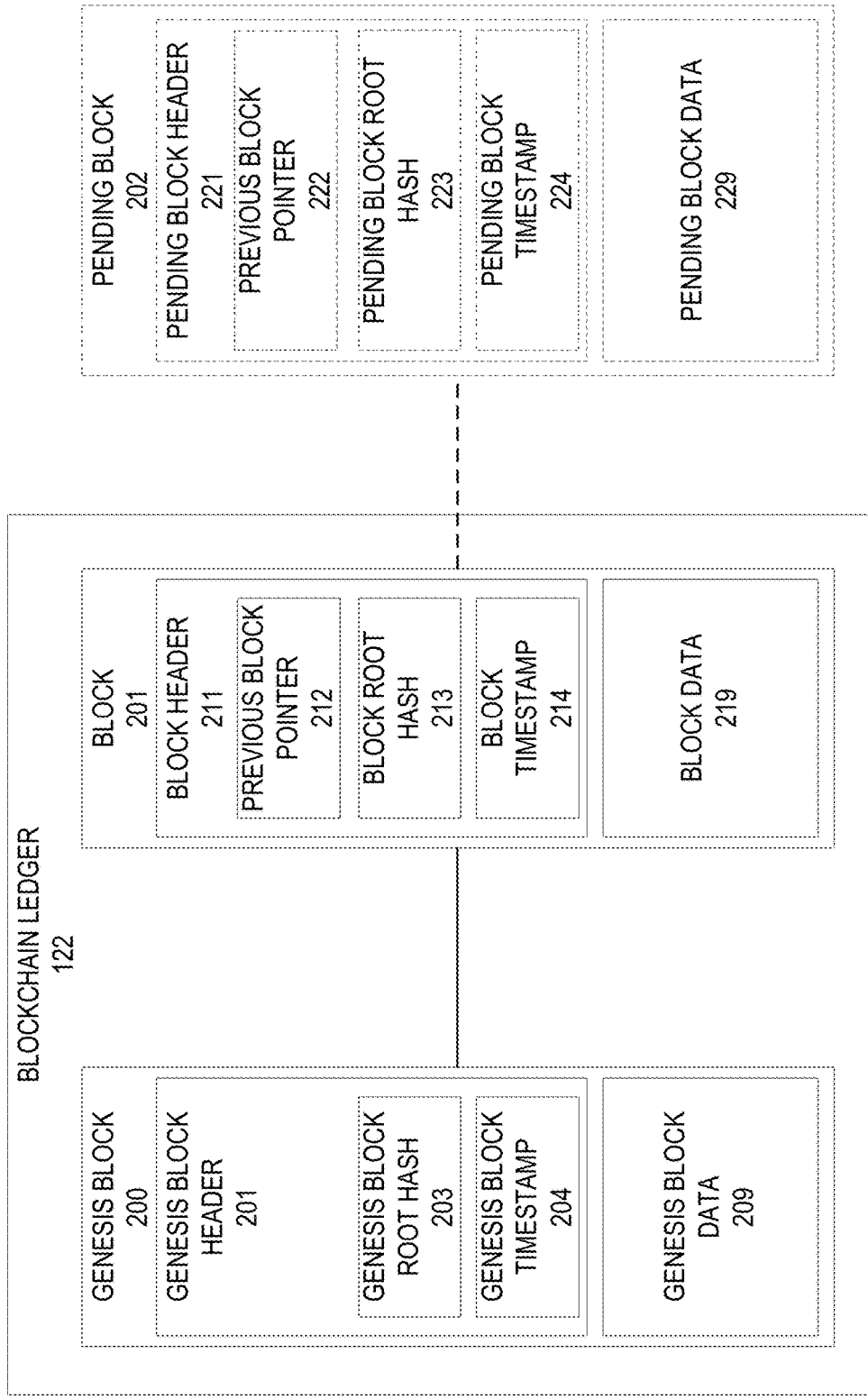
Figure 3:
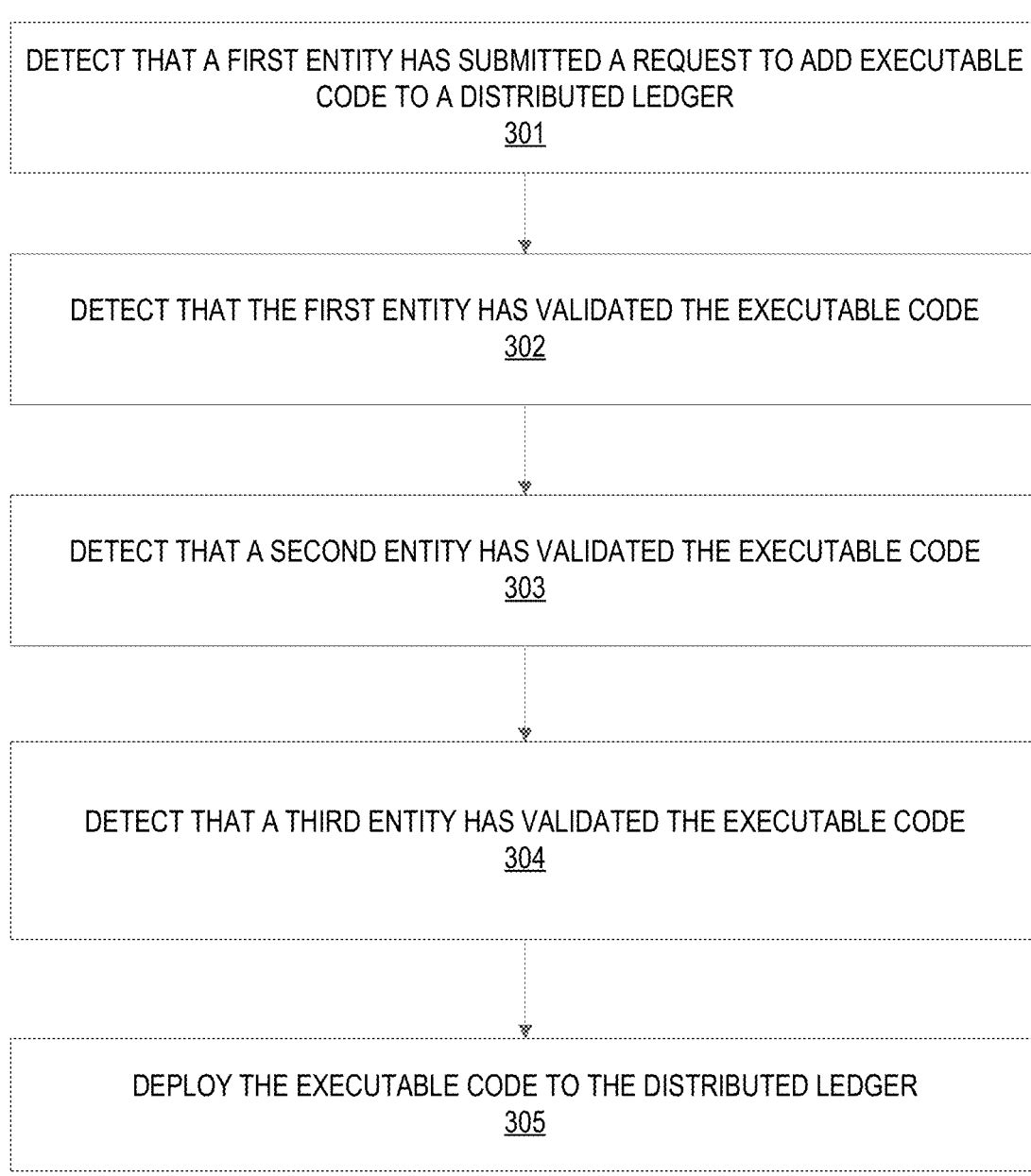
Figure 4:
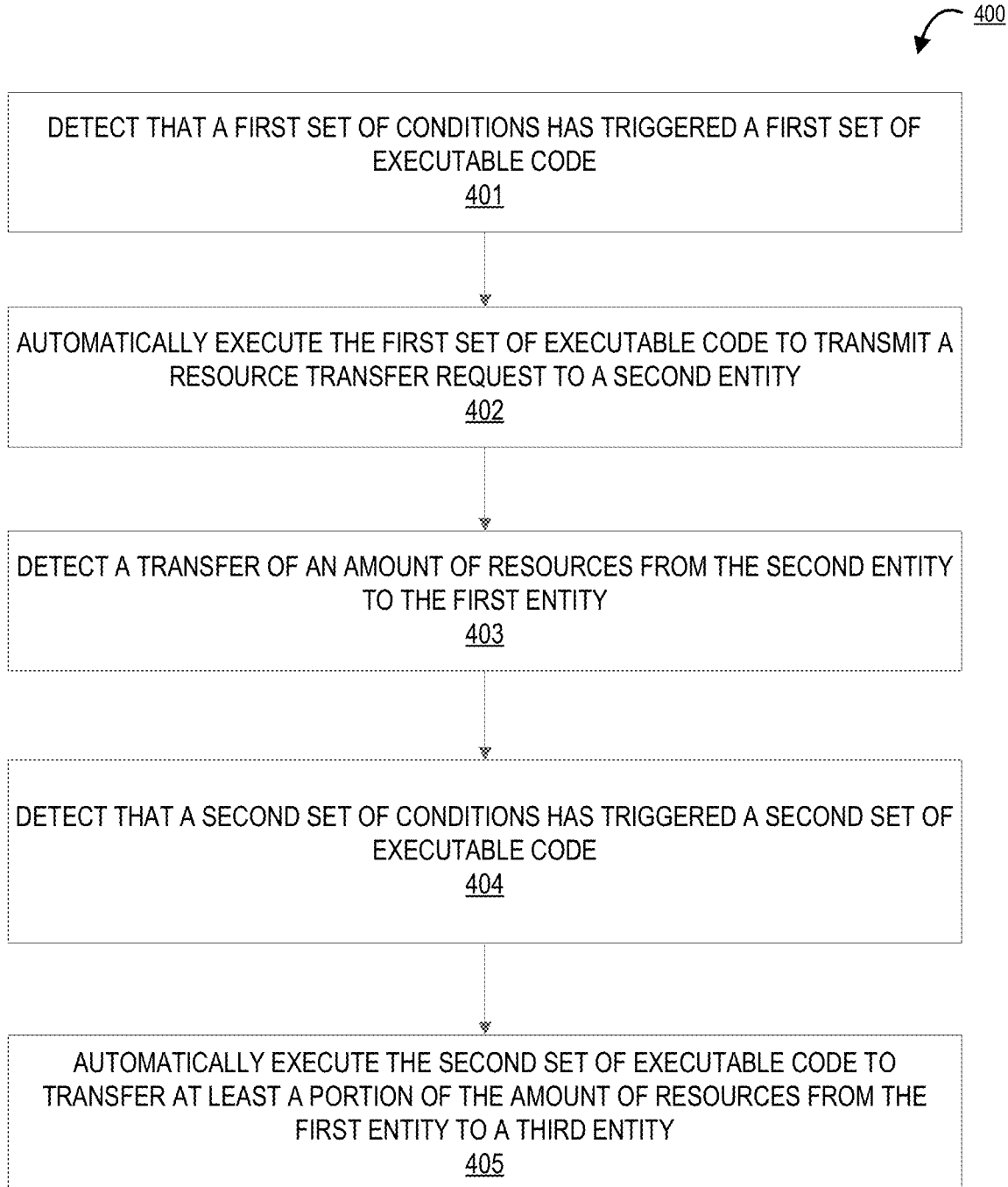
Figure 5:
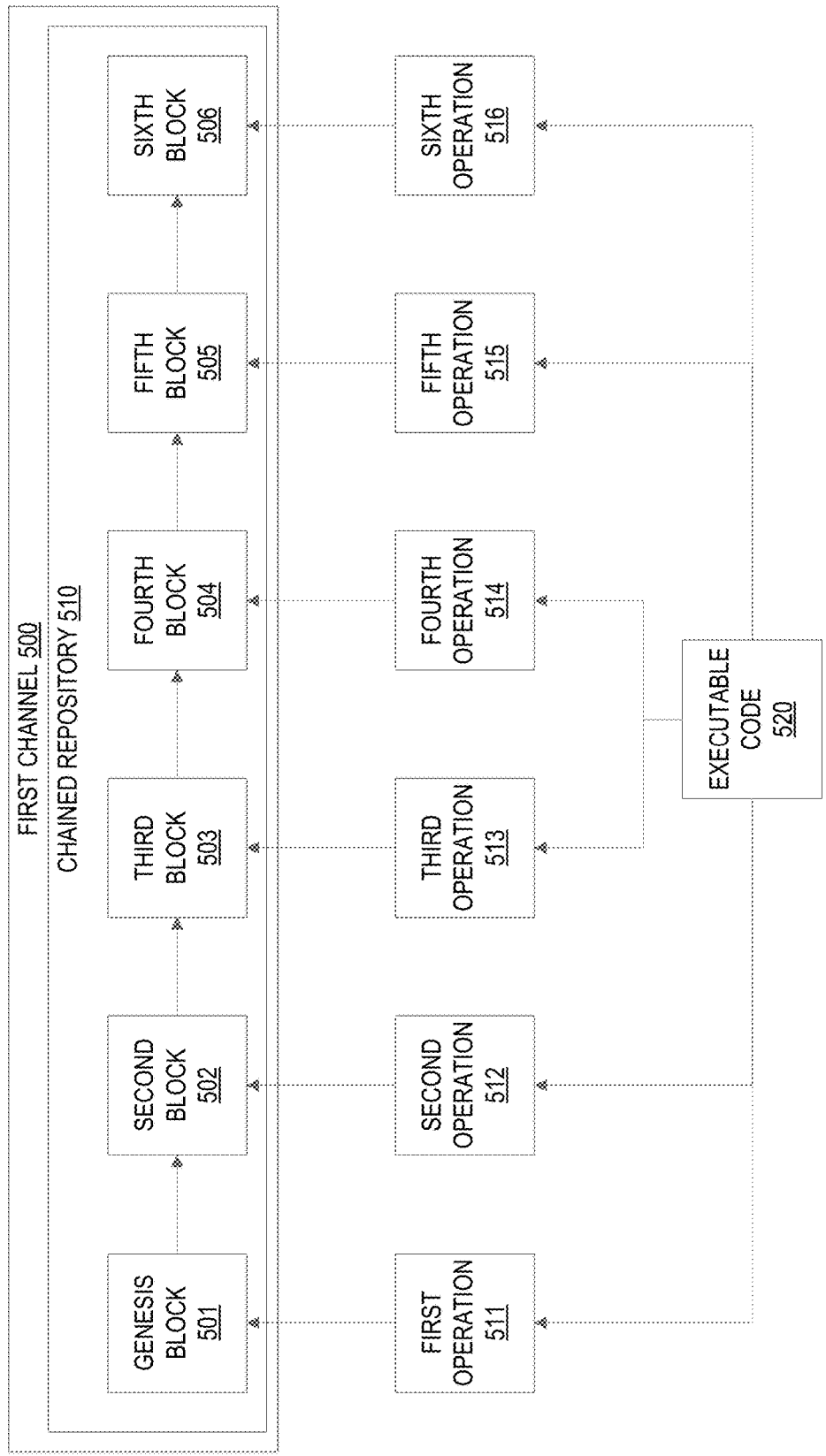

Having thus described embodiments of the invention in general terms, reference will now be made to the accompanying drawings, wherein:

FIG. 1 illustrates an operating environment for the resource transfer distributed server system, in accordance with one embodiment of the present disclosure;

FIG. 2 is a block diagram illustrating the data structures within an exemplary blockchain distributed ledger, in accordance with one embodiment of the present disclosure;

FIG. 3 illustrates a process flow for deploying executable code in the resource transfer distributed server system, in accordance with one embodiment of the present disclosure;

FIG. 4 illustrates a process flow for conducting a resource transfer using the resource transfer distributed server system, in accordance with one embodiment of the present disclosure; and FIG. 5 is a block diagram illustrating a channel-dependent chained repository for use in conducting a resource transfer, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed ledger," or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to an object under the ownership of a user which is stored or maintained by the entity on the user's behalf. The resource may be intangible or tangible objects such as data files, documents, funds, and the like. Typically, an account associated with the user contains records of the resources owned by the user. Accordingly, account data may be stored in an account database within the entity's systems.

Embodiments of the present disclosure provide system for automated resource transfer processing using a distributed server network. The system may comprise a distributed ledger network in which plurality of nodes host a distributed ledger which may comprise a list of data records regarding certain actions or processes executed within the system. In particular, the data records may relate to resource transfers involving multiple distinct entities. In such embodiments, each of the multiple entities may host at least one node of the distributed ledger. In this regard, the distributed ledger may be a private distributed ledger which is accessible only to selected entities (e.g., the entities involved in the resource transfer, certain authorized third parties, or the like). The distributed ledger may further comprise executable code (e.g., smart contracts) which may automatically execute certain processes upon the triggering of certain conditions or events. Through their respective nodes, each entity may be able to read/audit data records and/or the executable code within the distributed ledger as well as submit proposed data records and/or executable code to be added to the distributed ledger. Accordingly, each node may participate in the validation and/or approval of proposed data records and/or executable code (e.g., via a consensus mechanism).

An exemplary embodiment is provided below for illustrative purposes. In one embodiment, the distributed ledger may store data records regarding resource transfers (e.g., transactions such as security trustee payment processes), where the distributed ledger is hosted on nodes owned and/or operated by the related entities to the resource transfers (e.g., an issuer, a trustee, an investor, and/or the like). Each of the related entities may participate in the validation and/or approval of the deployment of smart contracts related to the resource transfer process. In some embodiments, the smart contract approval process may occur in a loop such that a first entity generates a smart contract and transmits the smart contract to a second entity. The second entity may audit the smart contract based on the underlying logic of the executable code and either approve or reject the smart contract. If rejected, the smart contract may be transmitted to the remainder of the related entities in sequence until the last entity gives a final approval for the smart contract to be deployed to the distributed ledger. In this way, the system may provide a transparent process for generating and validating smart contracts for multiple different entities.

Once at least on smart contract has been deployed to the distributed ledger as described above, one of the entities may begin the resource transfer process by triggering one of the smart contracts associated with the resource transfer. For example, a trustee may begin a security trustee payment process by triggering a smart contract which may cause an invoice to be transmitted to an issuer. Once the issuer submits payment to the trustee and the trustee receives the funds, the trustee may trigger a second smart contract to begin the fund distribution process (e.g., transfer funds to an investor). Each step of the resource transfer process may be submitted by the various nodes for addition to the distributed ledger. In this regard, each node may submit proposed data records to be appended to the distributed ledger, where the proposed data records may contain information regarding the steps that have been executed within the resource transfer process. For example, the issuer may submit a proposed data record indicating that payment has been sent to the trustee. Once said proposed data record is appended to the distributed ledger, all of the related parties to the resource transfer may become aware of the current state (e.g., the steps that have been completed and that have yet to be completed) of the resource transfer process. Furthermore, authorized access may be granted to specified third parties (e.g., regulatory agencies) for auditing purposes.

The system as described herein confers a number of technological advantages over conventional methods of processing resource transfers. In particular, storing the distributed ledger across all of the nodes within the distributed ledger network allows for automatic real-time or near real-time synchronization of data records while providing additional layers of security against data tampering or corruption. Furthermore, the private distributed ledger provides transparency and efficiency gains by drastically reducing the resource transfer processing time.

Turning now to the figures, FIG. 1 illustrates an operating environment 100 for the resource transfer distributed server system, in accordance with one embodiment of the present disclosure. In particular, FIG. 1 illustrates a first entity node 101 that is communicatively coupled with a second entity node 102 and a third entity node 103. The first entity node 101, second entity node 102, and third entity node 103 may be part of a distributed ledger network 107 in which each node maintains a copy of a distributed ledger as described herein. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, although FIG. 1 depicts the first entity node 101 and the second entity node 102 as separate computing systems, the functions of each may be executed on a single computing system. Furthermore, a single system, device, or server as depicted in FIG. 1 may represent multiple systems, devices, or servers. For instance, though FIG. 1 depicts a single third entity node 103, each entity may host more than one node. Furthermore, in some embodiments, the operating environment 100 may comprise nodes operated by additional entities (e.g., a fourth entity node, fifth entity node, and the like).

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the first entity node 101 may be a computing system that is owned and/or operated by a first entity. Accordingly, the first entity node 101 may be, for example, a networked terminal, server, desktop computer, or the like, though it is within the scope of the disclosure for the first entity node 101 to be a portable device such as a cellular phone, smart phone, smart device, personal data assistant (PDA), laptop, or the like. The first entity node 101 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of a distributed ledger 122. The distributed ledger (and the copy of the distributed ledger 122) may comprise a series of data records relevant to the objectives of the entity. For instance, the distributed ledger may comprise a series of data records comprising various types of information, such as resource transfer data, document data, or the like. The distributed ledger may further comprise executable code (e.g., smart contract logic) embedded within the distributed ledger. The smart contract logic may be executed by the various nodes and/or other computing systems within the network environment to automatically execute certain processes upon the occurrence of a preset condition.

As further illustrated in FIG. 1, the second entity node 102 may be a computing system that is owned and/or operated by a second entity. The second entity node 102 may comprise a communication device 132, processing device 154, and a memory device 136. The memory device 136 may comprise a data storage 138 and computer readable instructions 140, where the data storage 138 comprises a copy of the distributed ledger 122.

As further illustrated in FIG. 1, the third entity node 103 be a computing system that is owned and/or operated by a third entity. Accordingly, the third entity node 103 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, communication devices may also include a communication interface device that may be connected by a hardwire connection to the resource distribution device. The interface device may comprise a connector such as a USB, SATA, PATA, SAS or other data connector for transmitting data to and from the respective computing system.

The processing device 154 is operatively coupled to the communication device 152 and the memory device 156. The processing device 154 uses the communication device 152 to communicate with the network and other devices on the network, such as, but not limited to the first entity node 101. The communication device 152 generally comprises a modem, antennae, WiFi or Ethernet adapter, radio transceiver, or other device for communicating with other devices on the network. The memory device 156 may further include data storage 158 which may comprise a copy of the distributed ledger 122, along with computer readable instructions 160. The data within the copies of the distributed ledger 122 stored on the nodes 101, 102, 103 may be identical to one another. In this regard, the contents of the distributed ledger (and the copies of the distributed ledger 122) may be kept consistent with one another via a consensus algorithm, as described elsewhere herein.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/ or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary blockchain distributed ledger, in accordance with some embodiments. In particular, FIG. 2 depicts a plurality of blocks 200, 201 within the blockchain ledger 122, in addition to a pending block 202 that has been submitted to be appended to the blockchain ledger 122. The blockchain ledger 122 may comprise a genesis block 200 that serves as the first block and origin for subsequent blocks in the blockchain ledger 122. The genesis block 200, like all other blocks within the blockchain ledger 122, comprise a block header 201 and block data 209. The genesis block data 209, or any other instances of block data within the blockchain ledger 122 (or any other distributed ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the blockchain ledger 122. In some embodiments, the timestamp may be a Unix timestamp. In some embodiments, particularly in blockchains utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the blockchain. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (i.e., the genesis block 200) in the blockchain ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 202 or "proposed block" may be submitted for addition to the blockchain ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the blockchain ledger 122. A pending block timestamp 224 may also be added to signify the time at which the pending block 202 is added to the blockchain ledger 122.

In other embodiments, the consensus mechanism may be based on a total number of consensus inputs submitted by the nodes of the blockchain ledger 122, e.g., a PBFT consensus mechanism. Once a threshold number of consensus inputs to validate the pending block 202 has been reached, the pending block 202 may be appended to the blockchain ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 illustrates a process flow 300 for deploying executable code in a resource transfer distributed server system, in accordance with one embodiment of the present disclosure. The process begins at block 301, where the system detects that a first entity has submitted a request to add executable code to a distributed ledger. The logic of the executable code may be written or determined by the first entity, which may be the entity that coordinates the resource transfer process. In an exemplary embodiment, the first entity may be a trustee that uses the system to conduct a security trustee payment process. In such an embodiment, the trustee may submit a proposed smart contract to the nodes within the system for deployment to the distributed ledger. The smart contract may be configured to execute certain processes automatically upon being triggered. For instance, the smart contract may cause the system, according to the security term, to trigger an invoice to be generated and/or sent to a second entity, which may be an issuer of the security associated with the resource transfer process.

The process continues to block 302, where the system detects that the first entity has validated the executable code. Each node may participate in the validation and/or approval of the proposed smart contract before deployment. Accordingly, the submitter of the proposed smart contract (e.g., the first entity) may also be a part of the smart contract approval process.

The process continues to block 303, where the system detects that the second entity has validated the executable code. The second entity (e.g., an issuer) may use the system to read the smart contract logic and review the logic for accuracy. Subsequently, the second entity node may validate and approve the smart contract.

The process continues to block 304, where the system detects that a third entity has validated the executable code. The third entity may be, for instance, an investor in the security associated with the resource transfer process. Accordingly, the third entity may also read the smart contract logic and review for accuracy. The third entity node may then validate and approve the smart contract.

The process concludes at block 305, where the system deploys the executable code to the distributed ledger. The system may require that all of the related entities to the resource transfer process approve the smart contract before deploying the smart contract. Once each related entity has validated and approved the smart contract, the smart contract may be embedded in the distributed ledger. Subsequently, the detection of the triggering events or conditions by the system may automatically cause the smart contract to execute its processes as determined by the smart contract logic. In this way, the system described herein may increase the transparency and reliability of the resource transfer process.

FIG. 4 illustrates a process flow 400 for conducting a resource transfer using the resource transfer distributed server system. The process begins at block 401, where the system detects that a first set of conditions has triggered a first set of executable code. Continuing the above example, the first set of executable code may be a first smart contract that causes an invoice to be automatically generated and transmitted to the second entity (e.g., the issuer). The first smart contract may be triggered, for instance, according to the term of the security associated with the resource transfer process (e.g., a distribution payment becomes due). Details regarding the security term may in turn be stored within the distributed ledger as a data record such that the existence of the data record triggers execution of the first smart contract. When the first smart contract is triggered, the system may write a data record associated with the triggering of the first smart contract to the distributed ledger.

The process continues to block 402, where the system automatically executes the first set of executable code to transmit a resource transfer request to a second entity. The resource transfer request may be the invoice sent to the issuer upon the triggering of the first smart contract, where the invoice may be a request to transfer the resource (e.g., distribution funds associated with the security) to a certain entity (e.g., the trustee).

The process continues to block 403, where the system detects a transfer of an amount of resources from the second entity to the first entity. In response to the request, the issuer may transmit the distribution funds to the trustee (e.g., to an account of the trustee). The confirmation of the fund transmittal may further be recorded as a data record within the distributed ledger such that the existence of said data record may, at least in part, trigger the execution of other smart contracts. Furthermore, a subsequent data record confirming receipt of the funds by the trustee may also be appended to the distributed ledger.

The process continues to block 404, where the system detects that a second set of conditions has triggered a second set of executable code. Execution of the second set of executable code (e.g., a second smart contract) may be triggered upon the system detecting the existence of a data record indicating receipt of the distribution funds by the trustee. The second smart contract, once triggered, may automatically cause the distribution funds to be transferred from the trustee to a third entity (e.g., an investor).

The process concludes at block 405, where the system automatically executes the second set of executable code to transfer at least a portion of the amount of resources from the first entity to a third entity. As described above, the resources may be the funds to be distributed as part of the resource transfer process. Accordingly, in the event that multiple investors have an interest in the distribution funds, each investor may receive an allocation (e.g., at least a portion) of the distribution funds as part of the process as determined by the second smart contract. For instance, in embodiments in which there are two investors (e.g., a third entity and a fourth entity), the second smart contract may cause a first allocation of the funds to be sent to the third entity and a second allocation of the funds (e.g., the remainder) to be sent to the fourth entity.

In some embodiments, the system may grant authorized access to the distributed ledger to certain entities that are not directly related to the resource transfer process. For instance, the system may grant access to certain data records related to the resource transfer to a non-related third party entity for auditing purposes (e.g., a regulatory agency, insurance provider, or the like). In this way, the system may provide an efficient and open way to process resource transfers.

FIG. 5 is a block diagram illustrating a channel-dependent chained repository for use in conducting a resource transfer, in accordance with one embodiment of the present disclosure. In some embodiments, certain entities may wish to establish a secure and private channel through which the entities may conduct their resource transfers. In this regard, the system may generate a private channel for each specific set of entities along with separate blockchain ledgers assigned to each channel. For instance, a first channel may be established for entities A, B, and C, and a second channel may be established for entities D, E, and F. In such a configuration, the channels may be securely separated (e.g., using cryptographic keys and hashes) from one another such that the entities assigned to the first channel may not access the data records within the second channel, and vice versa.

Accordingly, FIG. 5 depicts a chained repository 510 (e.g., a blockchain ledger) comprising a genesis block 501, second block 502, third block 503, fourth block 504, fifth block 505, and a sixth block 506, where the chained repository 510 is assigned to a first channel 500. The data records within the chained repository 510 may be generated according to embedded executable code 520 within the chained repository (e.g., one or more smart contracts). The executable code 520 may, through a series of operations, add blocks to the blockchain ledger within the first channel 500 such that the blocks are inaccessible to entities who are not parties to the first channel 500.

In an exemplary embodiment, the system may generate a block for each completed step within a resource transfer process (e.g., a security trustee payment process). The executable code 520 may, through a first operation 511 (e.g., creation of account data for the entities involved, entity-specific information, security information, or the like), generate the genesis block 501 of the chained repository 510. The executable code 520 may then, through a second operation 512 (e.g., triggering of an security term), generate the second block 502. A third operation 513 (e.g., transmission of an invoice to an issuer) may cause the third block 503 to be generated. A fourth operation 514 (e.g., confirmation of receipt of payment) may cause the fourth block 504 to be generated. A fifth operation 515 (e.g., calculation allocation of distributions) may cause the fifth block 505 to be generated. Finally, a sixth operation 516 (e.g., transfer of distributions to one or more investors) may cause the sixth block 506 to be generated. In this way, the blocks 501, 502, 503, 504, 505, 506 may contain a complete history of actions taken within the resource transfer process within the first channel 500. Other resource transfer processes initiated by different sets of entities and related parties may be executed through a second channel with a separate chained repository, as described above. Accordingly, even if multiple entities share the same hardware system/platform, the channel-specific chained repositories allow a secure and private way to conduct resource transfers among specific groups of entities.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for performing resource transfers using a distributed server, the system comprising:
    a memory device with computer-readable program code stored thereon;
    a communication device; and
    a processing device operatively coupled to the memory device and the communication device, wherein the processing device is configured to execute the computer-readable program code to:
        detect that a first set of conditions has triggered a first set of executable code, wherein detecting that the first set of conditions has triggered the first set of executable code comprises reading a security term associated with a security from a first data record within a distributed ledger hosted on the distributed server, wherein the security term indicates that a distribution payment associated with the security has become due;
        automatically execute the first set of executable code to transmit a resource transfer request to a second entity based on detecting the first data record within the distributed ledger;
        detect, from a second data record within the distributed ledger, a transfer of an amount of resources from the second entity to a first entity, wherein the amount of resources from the second entity to the first entity comprises the distribution payment associated with the security, wherein the second data record indicates a transmittal of the amount of resources from the second entity to the first entity;
        detect, from a third data record within the distributed ledger, that a second set of conditions has triggered a second set of executable code, wherein the third data record indicates a receipt of the amount of resources by the first entity;
        based on detecting the third data record, automatically execute the second set of executable code to transfer a first allocation of the amount of resources from the first entity to a third entity;
        submit a request to add a third set of executable code to the distributed ledger;
        validate the third set of executable code, wherein validating the third set of executable comprises approving the third set of executable code;
        receive validation of the third set of executable code from a second entity node, wherein validation of the third set of executable code from the second entity node comprises an approval of the third set of executable code by the second entity;
        receive validation of the third set of executable code from a third entity node, wherein validation of the third set of executable code from the third entity node comprises an approval of the third set of executable code by the third entity; and
        deploy the third set of executable code to the distributed ledger based on: 1) validating the third set of executable code, 2) receiving validation of the third set of executable code from the second entity node, and 3) receiving validation of the third set of executable code from the third entity node.

2. The system according to claim 1, wherein the distributed ledger is a channel-dependent chained repository, wherein data records of the distributed ledger are assigned to a first private channel.

3. The system according to claim 1, wherein automatically executing the second set of executable code further comprises transferring a second allocation of the amount of resources from the first entity to a fourth entity.

4. The system according to claim 1, wherein the computer-readable program code further causes the processing device to provide authorized access of the distributed server to a non-related third-party entity.

5. The system according to claim 1, wherein the distributed server hosts a distributed ledger, wherein the first set of executable code and the second set of executable code are deployed to the distributed ledger as smart contracts.

6. The system according to claim 1, wherein the second set of conditions comprises receipt of the amount of resources by the first entity.

7. A computer program product for performing resource transfers using a distributed server, the computer program product comprising at least one non-transitory computer readable medium having computer-readable program code portions embodied therein, the computer-readable program code portions comprising executable code portions for:

detecting that a first set of conditions has triggered a first set of executable code, wherein detecting that the first set of conditions has triggered the first set of executable code comprises reading a security term associated with a security from a first data record within a distributed ledger hosted on the distributed server, wherein the security term indicates that a distribution payment associated with the security has become due;

automatically executing the first set of executable code to transmit a resource transfer request to a second entity based on detecting the first data record within the distributed ledger;

detecting, from a second data record within the distributed ledger, a transfer of an amount of resources from the second entity to a first entity, wherein the amount of resources from the second entity to the first entity comprises the distribution payment associated with the security, wherein the second data record indicates a transmittal of the amount of resources from the second entity to the first entity;

detecting, from a third data record within the distributed ledger, that a second set of conditions has triggered a second set of executable code, wherein the third data record indicates a receipt of the amount of resources by the first entity;

based on detecting the third data record, automatically executing the second set of executable code to transfer a first allocation of the amount of resources from the first entity to a third entity;

submitting a request to add a third set of executable code to the distributed ledger;

validating the third set of executable code, wherein validating the third set of executable comprises approving the third set of executable code;

receiving validation of the third set of executable code from a second entity node, wherein validation of the third set of executable code from the second entity node comprises an approval of the third set of executable code by the second entity;

receiving validation of the third set of executable code from a third entity node, wherein validation of the third set of executable code from the third entity node comprises an approval of the third set of executable code by the third entity; and deploying the third set of executable code to the distributed ledger based on: 1) validating the third set of executable code, 2) receiving validation of the third set of executable code from the second entity node, and 3) receiving validation of the third set of executable code from the third entity node.

8. The computer program product according to claim 7, wherein the distributed ledger is a channel-dependent chained repository, wherein data records of the distributed ledger are assigned to a first private channel.

9. The computer program product according to claim 7, wherein automatically executing the second set of executable code further comprises transferring a second allocation of the amount of resources from the first entity to a fourth entity.

10. The computer program product according to claim 7, wherein the computer-readable program code portions further comprise executable code portions for providing authorized access of the distributed server to a non-related third-party entity.

11. A computer-implemented method for performing resource transfers using a distributed server, the method comprising:

detecting that a first set of conditions has triggered a first set of executable code, wherein detecting that the first set of conditions has triggered the first set of executable code comprises reading a security term associated with a security from a first data record within a distributed ledger hosted on the distributed server, wherein the security term indicates that a distribution payment associated with the security has become due;

automatically executing the first set of executable code to transmit a resource transfer request to a second entity based on detecting the first data record within the distributed ledger;

detecting, from a second data record within the distributed ledger, a transfer of an amount of resources from the second entity to a first entity, wherein the amount of resources from the second entity to the first entity comprises the distribution payment associated with the security, wherein the second data record indicates a transmittal of the amount of resources from the second entity to the first entity;

detecting, from a third data record within the distributed ledger, that a second set of conditions has triggered a second set of executable code, wherein the third data record indicates a receipt of the amount of resources by the first entity;

based on detecting the third data record, automatically executing the second set of executable code to transfer a first allocation of the amount of resources from the first entity to a third entity;

submitting a request to add a third set of executable code to the distributed ledger;

validating the third set of executable code, wherein validating the third set of executable comprises approving the third set of executable code;

receiving validation of the third set of executable code from a second entity node, wherein validation of the third set of executable code from the second entity node comprises an approval of the third set of executable code by the second entity;

receiving validation of the third set of executable code from a third entity node, wherein validation of the third set of executable code from the third entity node comprises an approval of the third set of executable code by the third entity; and deploying the third set of executable code to the distributed ledger based on: 1) validating the third set of executable code, 2) receiving validation of the third set of executable code from the second entity node, and 3) receiving validation of the third set of executable code from the third entity node.

12. The computer-implemented method of claim 11, wherein the distributed ledger is a channel-dependent chained repository, wherein data records of the distributed ledger are assigned to a first private channel.

13. The computer implemented method of claim 11, wherein automatically executing the second set of executable code further comprises transferring a second allocation of the amount of resources from the first entity to a fourth entity.

14. The computer implemented method of claim 11, wherein the method further comprises providing authorized access of the distributed server to a non-related third-party entity.

15. The computer implemented method of claim 11, wherein the distributed server hosts a distributed ledger wherein the first set of executable code and the second set of executable code are deployed to the distributed ledger as smart contracts.

* * * * *